(12) United States Patent
Hughes et al.

(10) Patent No.: US 7,090,178 B2
(45) Date of Patent: Aug. 15, 2006

(54) SEALED ROTARY JOINT FOR TURRET ROTATOR

(75) Inventors: Michael R. Hughes, Brookline, NH (US); Thomas M. Sommer, Groton, MA (US); Ronald J. Rosi, Saugus, MA (US)

(73) Assignee: Flir Systems Inc., North Billerica, MA (US)

( * ) Notice: Subject to any disclaimer, the term of this patent is extended or adjusted under 35 U.S.C. 154(b) by 69 days.

(21) Appl. No.: 10/915,503

(22) Filed: Aug. 10, 2004

(65) Prior Publication Data

US 2006/0033288 A1 Feb. 16, 2006

(51) Int. Cl.
*F16M 11/04* (2006.01)

(52) U.S. Cl. .............................. 248/187.1; 248/177.1; 277/412; 277/411; 464/29

(58) Field of Classification Search ............. 248/187.1, 248/177.1; 277/412, 411; 454/29
See application file for complete search history.

(56) References Cited

U.S. PATENT DOCUMENTS

| | | | | |
|---|---|---|---|---|
| 4,357,024 A | * | 11/1982 | Raj ............................. | 277/302 |
| 4,772,032 A | * | 9/1988 | Raj et al. ..................... | 277/410 |
| 4,890,940 A | * | 1/1990 | Schmidt et al. ............. | 384/446 |
| 5,694,621 A | * | 12/1997 | Dowe et al. .................. | 396/25 |
| 6,015,153 A | * | 1/2000 | Sharrer ........................ | 277/412 |
| 6,421,201 B1 | * | 7/2002 | Khan et al. .............. | 360/97.02 |
| 6,925,694 B1 | * | 8/2005 | Sauter et al. ................... | 29/40 |

\* cited by examiner

*Primary Examiner*—Carl D. Friedman
*Assistant Examiner*—Todd M. Epps
(74) *Attorney, Agent, or Firm*—Edward L. Kelley; Invention Management Associates (57) ABSTRACT

A rotatable payload support turret for operation in a potentially hazardous environment includes a fixed element attached to a vehicle or fixed structure and a rotatable element, supported for rotation with respect to the fixed element. The turret includes a camera payload having a pointing direction configured to be upwardly pointing. An annular clearance gap formed between the fixed element and the rotatable element is sealed by a conventional gas tight magnetic fluid seal element. A wiper seal is also provided in the clearance gap between the location of the magnetic fluid and the external environment to prevent breakdown of the magnetic fluid by elements of the potentially hazardous environment. The clearance gap may also form a labyrinth seal having up to three legs that are oriented to oppose a gravitational force direction. In addition, the fixed element may include a fluid repelling feature for repelling streams of incoming fluids thereby deflecting elements of the potentially hazardous environment away from an outer opening of the clearance gap.

11 Claims, 6 Drawing Sheets

SEALED ROTARY JOINT FOR TURRET ROTATOR

BACKGROUND OF THE INVENTION

1. Field of the Invention

The invention provides a method and apparatus for sealing a rotary joint formed between a fixed element and a rotatable element. In particular, a rotary joint formed between a fixed member a rotating member includes a continuous annular clearance gap formed between the fixed member and the rotating member. The clearance gap is sealed to prevent environmental elements from penetrating the clearance gap by providing a combination of sealing elements and features, including a labyrinth seal configuration, a wiper seal and a conventional gas-tight fluid seal within the clearance gap. In addition, the fixed member include features for repelling damaging external environmental elements thrust upon it by wind or wave action.

2. Description of the Prior Art

Turret mounted airborne camera systems are used in military and public safety for search and rescue, surveillance and reconnaissance. Turret mounted airborne camera systems are also used by the news media for generating broadcast quality images. Airborne camera systems comprise a sensor payload having one or more radiation detecting sensors with each sensor having an associated optical system for forming an image of a scene or object onto the sensors. The payload may include one or more radiation emitters such as a laser, for laser range finding, or another radiation source for illuminating a scene or object at a desired spectral range. In general, each sensor or emitter system of the payload has a limited field of view for receiving radiation from or emitting radiation to and the limited field of view may be adjustable in size by increasing or decreasing optical magnification. A central axis of the field of view defines a pointing direction.

In one prior art example of an airborne camera configuration, manufactured by FLIR SYSTEMS of North Billerica Mass., (the assignee of the present invention), the sensor/emitter payload is housed within a sealed spherical, or ball, housing that includes one or more sealed apertures for receiving or emitting radiation therethrough. (See FLIR product Ultra 8500. ) The payload includes a visible light intensifying or low light visible camera, an infrared camera, and a laser illuminator. The pointing direction of each payload element is substantially pointed at the same location in a far field of the sensor/emitter system. The ball housing is supported by a motorized turret that rotates the ball about two axes for directing the pointing direction onto a desired target area. The turret is configured to rotate the payload ball by about 180 degrees in elevation to direct the pointing direction from an axis normal to the ground to an axis directed at either horizon. The turret is also configured to rotate the payload ball continuously in azimuth to direct the pointing direction over a 360 degree range. The example airborne camera system is available for mounting on a helicopter or a fixed wing aircraft. It is usually the case that such an airborne camera system is carried on the underside of the aircraft with the pointing direction being generally directed toward the ground during operation. While airborne camera systems are usually well protected from airborne environmental hazards such shock, vibration, high speed airflow, rain, extreme temperature variations and the like, airborne camera systems have heretofore been designed with a downward facing turret and ball assembly.

Recently, the demand for increased surveillance in many areas has lead to the need for camera systems of similar design and capabilities to be mounted on land and sea vehicles as well as onto fixed structures. In early attempts to meet these demands, standard turret mounted airborne camera systems have been mounted onto ships, land vehicles and fixed structures for land and sea based missions. However, in land and sea based applications, it is has nearly always been the case that the camera system is mounted on the topside of the vehicle or fixed structure with its turret and ball assembly facing upward. However, using a standard airborne camera with its turret and ball assembly facing upward has proved to be problematic. In particular, land and sea based camera systems have been damaged by environmental elements penetrating seals and contaminating the payload ball and the turret motor drive systems. Users of upward facing turret and ball assemblies have experienced contaminate penetration failures caused by wind blown sand and other particulate matter as well as rain on land, and by wind and wave driven water and salt fog or mist at sea. One reason for these failures has been shown to be that the upward facing turret is particularly susceptible to contaminates collecting in and filling the upward facing annular clearance gap between a fixed turret base and a rotating turret member. In particular, the turrets upward facing 360 degree azimuth rotation mechanism is susceptible to contaminate penetration. While the azimuth rotation mechanism of prior art camera systems include a conventional magnetic fluid gas-tight seals in its annular clearance gap, applicants have found that the fluid of the gas-tight seals breaks down quickly in the presence of environmental contaminates that make contact with the magnetic fluid. Since the azimuth rotary joint faces downwardly in airborne cameras, contaminants were unable to collect in the clearance gap and contact the magnetic fluid. However, when the clearance gap faces upward, there is a need to provide additional sealing in the gap to prevent environmental contaminates from coming into contact the magnetic fluid of the gas tight seal.

In one prior art example of magnetic fluid seal used in combination with another seal, U.S. Pat. No. 4,890,940 by Schmidt et al. teaches a ball bearing that includes a gas tight fluid seal formed between one end of an inner and an outer race of the ball bearing. The fluid seal comprises a magnet circuit for providing a flux path in which a magnetic fluid is contained within a thin an annular clearance gap formed between the inner and outer races. The magnetic fluid forms a gas tight seal between an internal bearing environment and an external environment. Schmidt et al. teach a pre-seal positioned between the fluid seal and the internal bearing environment for preventing bearing lubricant from mixing with the magnetic fluid and altering its magnetic properties. The pre-seal, taught by Schmidt et al., utilizes the continuous high rotational velocity of the bearing inner race combined with a particular shape of a pre-seal wall facing the inner race to generate a centrifugal force local to the pre-seal wall facing the inner race and the centrifugal force pushes lubricant away from the pre-seal. The pre-seal is also configured to provide an annular liquid trapping groove for trapping magnetic fluid that may become separated from the gas seal. While the pre-seal of Schmidt et al. includes features that help to keep the internal bearing lubricant separated from the magnetic fluid of the gas seal, the pre-seal of Schmidt et al. still leaves an unsealed annular gap between the rotating inner race and the fixed outer race and this gap may be penetrated by contaminants. Moreover, the pre-seal, of Schmidt et al., requires continuous high speed rotation to generate the centrifugal force necessary to repel bearing lubricant from the seal area. However, the azimuth rotation of the present invention does not rotate continuously nor does it rotate at high speed so that a pre-seal of the type taught by Schmidt et al. would be ineffective. Moreover, the pre-seal of Schmidt et al. is particularly designed for one contaminate, the bearing lubricant, which has known properties and the seal may not be affective in sealing the gap from a variety of contaminants having different properties. Accordingly, there is a need for a pre-seal that is usable for preventing a variety of contaminates having different properties from reaching a magnetic fluid used in a gas-tight magnetic seal when the rotation of the rotary joint is a not continuous and not at a high velocity.

BRIEF SUMMARY OF THE INVENTION

The present invention overcomes the problems cited in the prior by providing a rotary joint for operating in an environment of potentially harmful elements. The rotary joint comprises a fixed element having an internal cavity formed therein for housing one or more elements that may be damaged by the potentially harmful elements. A rotatable element is supported for rotation with respect to said fixed element and an annular clearance gap is formed between opposing surfaces of the fixed element and the rotatable element. The annular clearance gap extends from the environment of potentially harmful elements to the internal cavity.

As a first element for sealing the clearance gap, a labyrinth seal is formed between opposing surfaces of the fixed element and the rotatable element. The labyrinth seal includes at least one and up to three legs of the clearance gap oriented and or sized to resist infiltration of said potentially harmful elements, e.g. each leg may be oriented substantially opposed to a gravitational force direction (i.e. vertical), or oriented to be generally opposed to a gravitational force direction, (i.e. more than 45 degrees from horizontal), or the dimension of the clearance gap may be small enough to present a high resistance to the entry of contaminating elements into the clearance gap, e.g. less than about 0.75 mm.

As a second element for sealing the clearance gap, a wiper seal is positioned in the clearance gap for closing the clearance gap. The wiper seal comprises a fixed annular seal surface attached to the fixed element and an annular flexible seal element attached to the rotatable element. The wiper seal annular flexible seal element is forced into contact with the fixed annular seal surface by a bending force generated by an interference contact between the annular flexible seal element and the fixed annular seal surface when the fixed and rotatable elements are assembled together in an operating configuration. The wiper seal may also include said annular seal wiper element captured between the annular flexible seal element and the fixed annular seal surface for reducing friction and wear in the wiper assembly.

Accordingly, the annular seal wiper element may comprise a material having a dry lubricating, wear resistant compound, such as a polymetric reinforced layer of polytetrafluroroethylene, (PTFE) incorporated therein.

As a third element for sealing the clearance gap a gas tight seal is attached to the fixed element and interacts with the rotatable element to support a magnetic fluid in the clearance gap. The gas tight seal is positioned within the clearance gap between the internal cavity and the position within the clearance gap of the wiper seal. In particular, the wiper seal is provided to prevent potentially harmful elements from interacting with and changing the characteristics of the magnetic fluid.

While the preferred embodiment of the present invention uses all three seal elements, listed above, to seal the clearance gap from potentially harmful elements, any one or any two of the seal elements may be used alone or in combination without deviating from the present invention. In addition the present invention includes other features incorporated into the elements of the rotary joint including a feature for repelling incoming fluid away from the rotary joint and for providing a drain path for draining materials out of the clearance gap should they be forced into the clearance gap by outside forces such as wind and wave action.

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
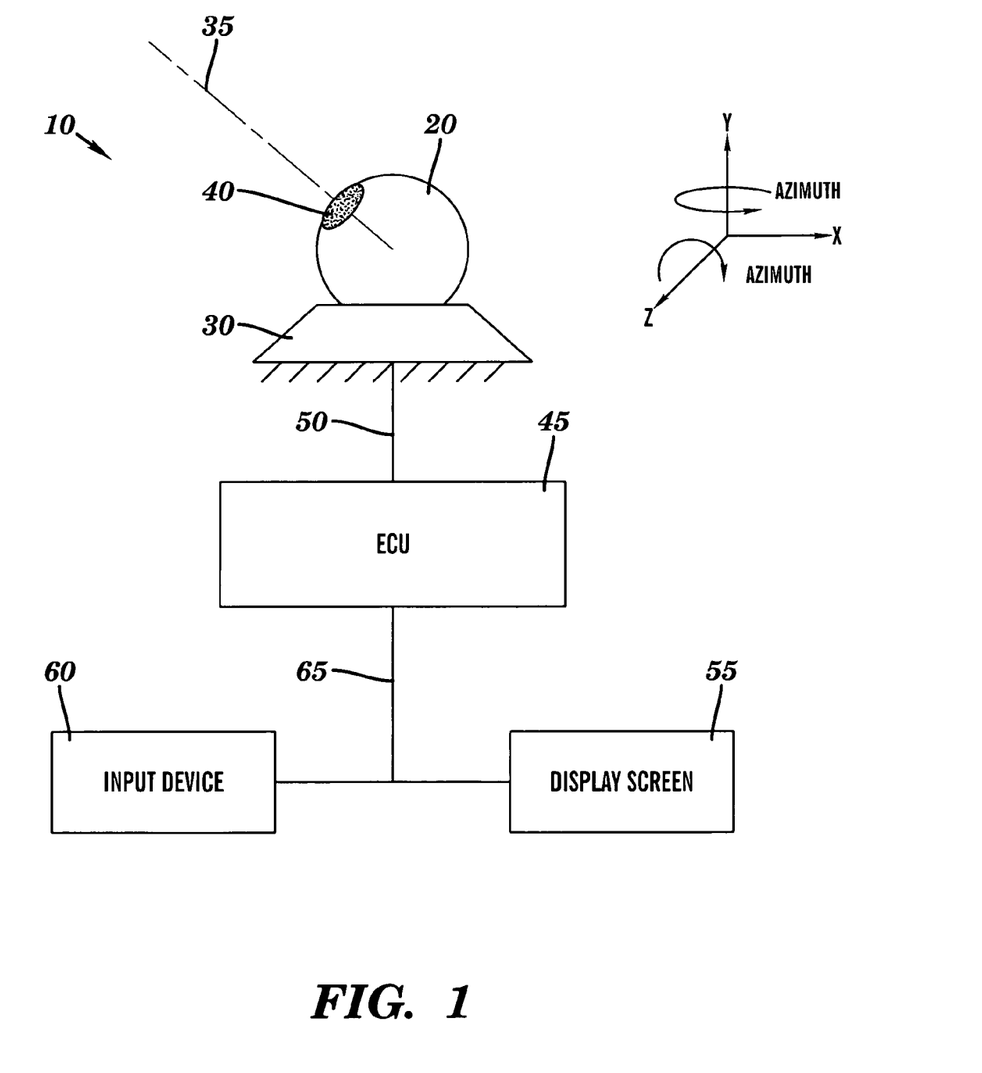
FIG. 1 illustrates a schematic representation of an airborne camera system having a turret mounted sensor/emitter payload according to the present invention.

Referring to FIG. 1, a block diagram depicts a sensor/emitter system 10 according to the present invention. The sensor/emitter system 10 includes a sensor or emitter payload packed inside a spherical ball housing 20. The payload may include sensors and emitters, optical systems, and control elements as required. In general, each sensor or emitter system of the payload includes a field of view, which may be adjustable in size, and a line of sight or pointing direction that is substantially coincident with the center of the field of view. More generally, the payload may comprise any device that has a pointing direction and needs to be rotated about one or two axes to direct the pointing direction at a target object. In FIG. 1, a pointing direction 35 is centered in an aperture 40, formed in the ball housing 20; however, the aperture 40 may comprise more than one aperture, depending upon the payload configuration, and the aperture 40 may be used to receive or emit radiation.

The ball 20 is supported for rotation by a turret style rotator assembly 30, which is fixedly attached to a fixed object or a vehicle. The turret 30 is configured for rotation in azimuth, (about the Y-axis) and in elevation, (about the Z-axis, normal to the page), to allow the pointing direction to be moved to a desired orientation. In FIG. 1, the turret mounted ball housing 20 is shown upwardly facing as would be the case for a sensor/emitter system mounting on a ground or sea vehicle or mounted on a fixed structure. In a preferred embodiment of the present invention, the payload includes a low light or image enhanced visible light sensing camera system, an infrared radiation sensing camera system, a laser rangefinder for determining a target distance and a separate optical system associated with each device.

An Electronic Control Unit, (ECU) 45 is in communication with the payload via a communication link 50, which may comprise a hard wired or wireless communication link. The ECU comprises one or more control systems for controlling the motion of the turret and for controlling each of the sensor or emitter devices of the payload. The ECU 45 may include, power supplies, sensor and emitter controls, automated controls, (e.g. optical system auto focus, pointing direction auto tracking, illumination control etc.), a digital image processor for receiving and manipulating images from sensor elements, a Global Positioning Sensing, (GPS) device, image data and program storage devices and a Central Processor Unit (CPU) for coordinating the control thereof. In general, the ECU 45 is housed inside the vehicle; however, some or all of the ECU functionality can be included within the sensor emitter payload ball 20 or in some cases may be positioned remote from the vehicle such as when the payload is being carried by an unmanned device.

The sensor/emitter system 10 also includes an image display device 55 and an operator input device 60, each in communication with the ECU 45 via a communication link 65. In general, the sensors of the payload receive radiation from a scene and form an unprocessed image of the scene. The unprocessed image is communicated to the ECU 45, which processes each image of the scene and sends a processed scene image to the display device 55.

In general, a dedicated operator may control various characteristics of the sensor/emitter system 10 using input commands. The input commands are input in response to actuating various switches, joysticks and other electromechanical input control elements included on the input device 60. Input commands may be used to control the turret device for changing its pointing direction or to control the functional operation of the sensing and emitting systems incorporated within the payload. In particular, the input device 60 may be used to change the pointing direction, the field of view, to select a spectral image characteristic, to emit a laser or illumination beam, or to control the ECU 45, e.g. for selecting various control features incorporated therein.

Figure 2:
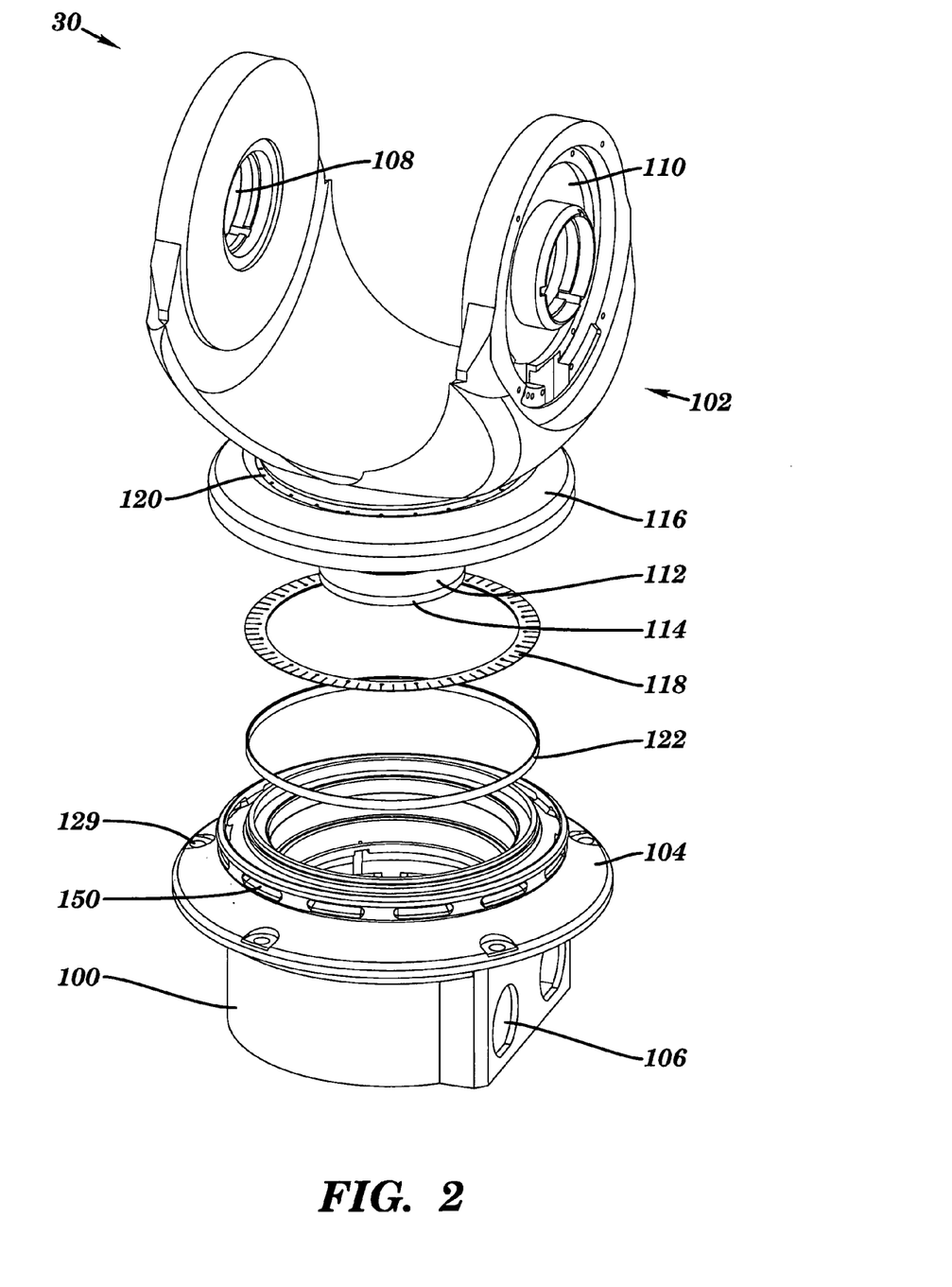
FIG. 2 illustrates an exploded isometric view of a rotary joint for azimuth rotation of the sensor/emitter payload according to the present invention.

Referring now to FIG. 2, a turret style rotating assembly 30, according to the present invention, is shown in exploded view with the sensor ball housing 20 removed. The turret 30 includes an azimuth housing 100 for supporting a yoke 102 and the yoke 102 is supported for azimuth rotation, (about the Y-axis), with respect to the fixed azimuth housing 100. The azimuth housing 100 includes a flange portion 104 that serves as an attaching flange for attaching the azimuth housing 100 to a vehicle or other mounting structure. A pair of openings 106 is provided in the base of the azimuth housing 100 to receive electrical connectors therein for providing a communications interface with the ECU 45. A hollow cylindrical cavity is provided inside the azimuth housing 100 for housing an azimuth rotary motor, a rotary encoder and an electrical interface that receives electrical signals from the payload and communicates those signals to the ECU. Rotation of the yoke 102, in azimuth, may be controlled automatically, e.g. to track a target object using auto tracking features included within the ECU, or the yoke 102 may be manually rotated in azimuth in response to input commands by the operator. In any event, the azimuth rotation may not be continuous or uniform in rotational velocity, nor will it rotate at a high rate of rotational velocity.

The yoke 102 includes co-aligned mounting holes 108 for receiving and rotationally supporting shaft elements extending from the ball housing 20. The mounting holes 108 specifically support the ball housing 20 for rotation in elevation, (i.e. about the X-axis). The yoke 102 is also formed with an outward facing recessed cavity 110 surrounding each of the co-aligned mounting holes 108 and the cavities 110 provide mounting surfaces and a housing for a rotary motor, a rotary encoder and an electrical interface, none shown, for providing and controlling rotation of the ball housing 20, in elevation, and for receiving electrical signals from the payload. In addition, the ball housing/yoke interface may include conductive slip rings, or the like, for communicating electrical signals from the payload to the electrical interface stored inside the azimuth housing 100 by conductive pathways provided inside the yoke 102. Each of the recessed cavities 110 are covered and sealed from the external environment and each may include a wiper seal, according to the present invention, such as is described below.

The yoke 102 is configured to provide a cylindrical shaft 112 extending from a bottom end thereof and the shaft 112 installs into the hollow cylindrical cavity inside the azimuth housing 100. The shaft 112 installs into rotary bearings attached to the azimuth housing 100 and is supported for rotation by the rotary bearings, not shown. The shaft 112 further includes a conducting slip ring 114 at its distal end and the conducting slip ring 112 is used to communicate electrical signals between any of the electrical elements supported by the yoke 102 and the electrical interface housed within the azimuth housing 100. To protect the elements housed inside the azimuth housing, a cascade hood 116 is installed onto the shaft 112 and fixedly attached thereto by an adhesive or appropriate fastener. The cascade hood 116 rotates with the shaft 112 and the yoke 102 and is specifically provided to deflect water, air and airborne contaminates for entering the rotary joint formed between the yoke 102 and the azimuth housing 100.

Also shown in FIG. 2 is an annular rotary pre-seal assemble 118. The pre-seal assembly 118 is fixedly attached to the cascade hood 116 by a plurality of threaded fasteners installed in threaded mounting holes 120. The pre-seal assembly 118 rotates with the cascade hood 116. Also depicted in FIG. 2 is an annular seal ring 122. The seal ring 122 is fixedly attached to the azimuth housing 100 by adhesive bonding, or another appropriate attaching means, and an upward facing surface of the seal ring 122 is positioned to remain in contact with the pre-seal assembly 118 over its entire surface when the yoke 102 and the cascade hood 116 are assembled with the azimuth housing 100.

Figure 3:
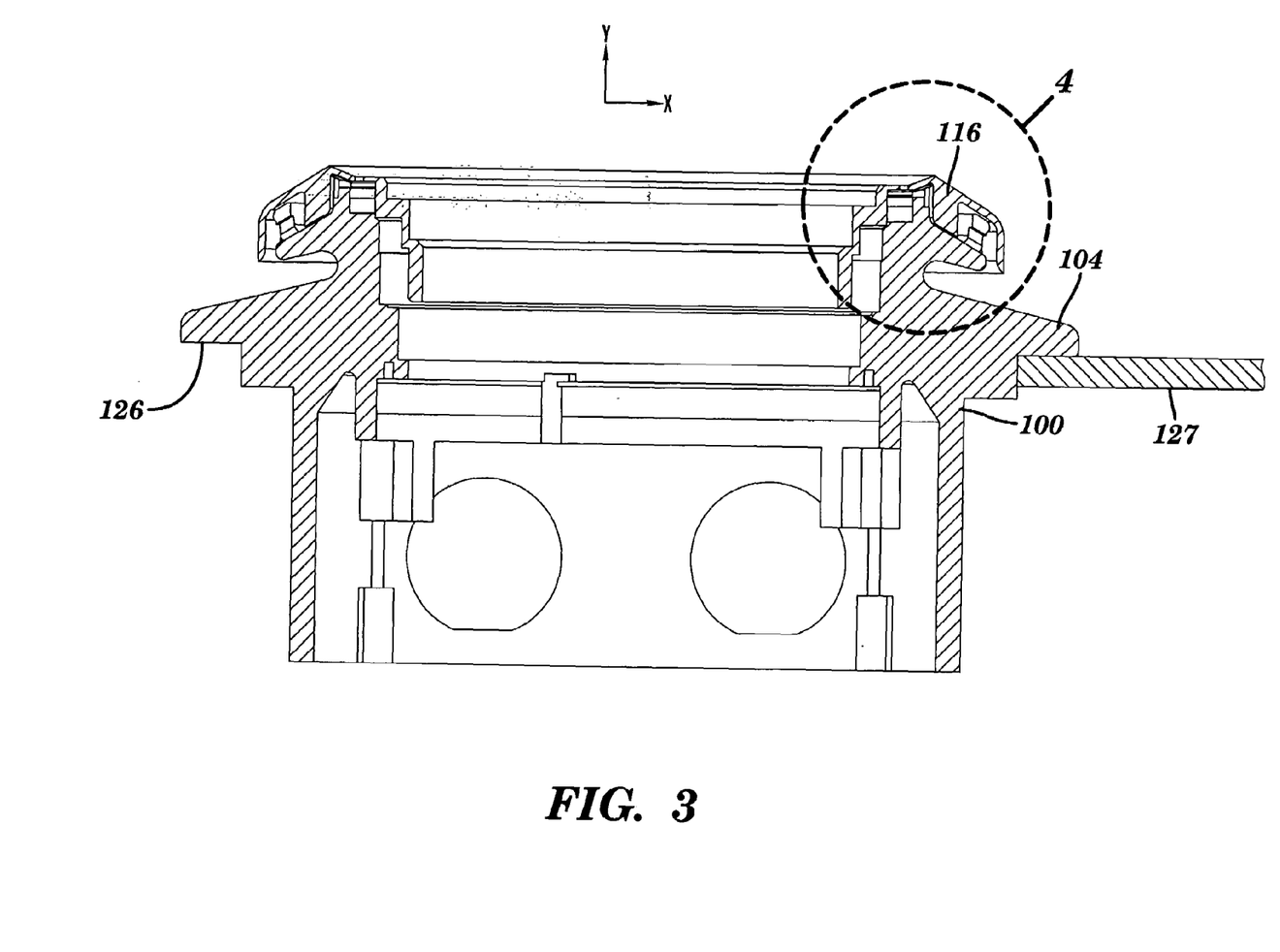
FIG. 3 illustrates a fixed azimuth housing assembled with a cascade hood cover shown in section view according to the present invention.

Referring now to FIG. 3, the azimuth base 100 and the cascade hood 116 are shown assembled together in an operating position. The yoke 102 is not shown. The view of FIG. 3 is shown with the Y-axis pointing vertically upward, i.e. opposed to gravitational forces. The view is sectioned in two places to clearly depict the form of the cascade hood 116 and azimuth housing 110. As stated above, the cascade hood 116 attaches to the shaft 112 and therefore rotates with respect to the azimuth housing 100 and a rotary joint is formed between the fixed azimuth housing 100 and the cascade hood 116. Similarly, a rotary joint is formed between the ball housing 20 and the yoke 102. In each rotary joint there is a clearance gap formed between opposing surfaces of the fixed and the rotatable element, or elements, to allow free rotation thereof. It is an important functional aspect of the present invention that the clearance gaps formed in each rotary joint be sealed or otherwise resistive to the infiltration of environmental elements such as wind and wave driven water, salt, sand, fog, mist and other environmental elements that may corrode or otherwise destroy the elements housed inside the azimuth housing 100 or the recessed cavities 110. In particular, potentially damaging environmental elements may comprise any fluid, e.g. a gas or a liquid, or any solid material, or combinations thereof that may infiltrate the clearance gap. However, in most cases, the turret system can operate without failure without the need for a gas tight seal so long as liquids and fine grained solid contaminates are prevented infiltrating the clearance gap over its full length and penetrating the internal cavities or recesses housing sensitive equipment such as electronics, optics and rotating mechanical elements. At the same time, each rotary joint must be free to rotate and the rotations must occur smoothly and without slipping or sticking. In particular, the auto tracking feature of the turret mounted camera system of the present invention employs servo controlled motor drivers for automatically controlling the azimuth and elevation of the pointing direction, and any irregularities in the rotation characteristics of either of the rotary joints will usually cause the servo motor drivers to fail. In addition, the cylindrical cavity inside the azimuth housing 100 and the yoke recessed areas 110 may need to be maintained at a non-ambient pressure, depending upon the application, and the non-ambient pressure may be a higher or a lower pressure than the pressure of the local external environment. Accordingly, in these applications, the clearance gaps formed in each rotary joint may need to be gas tight.

Figure 4:
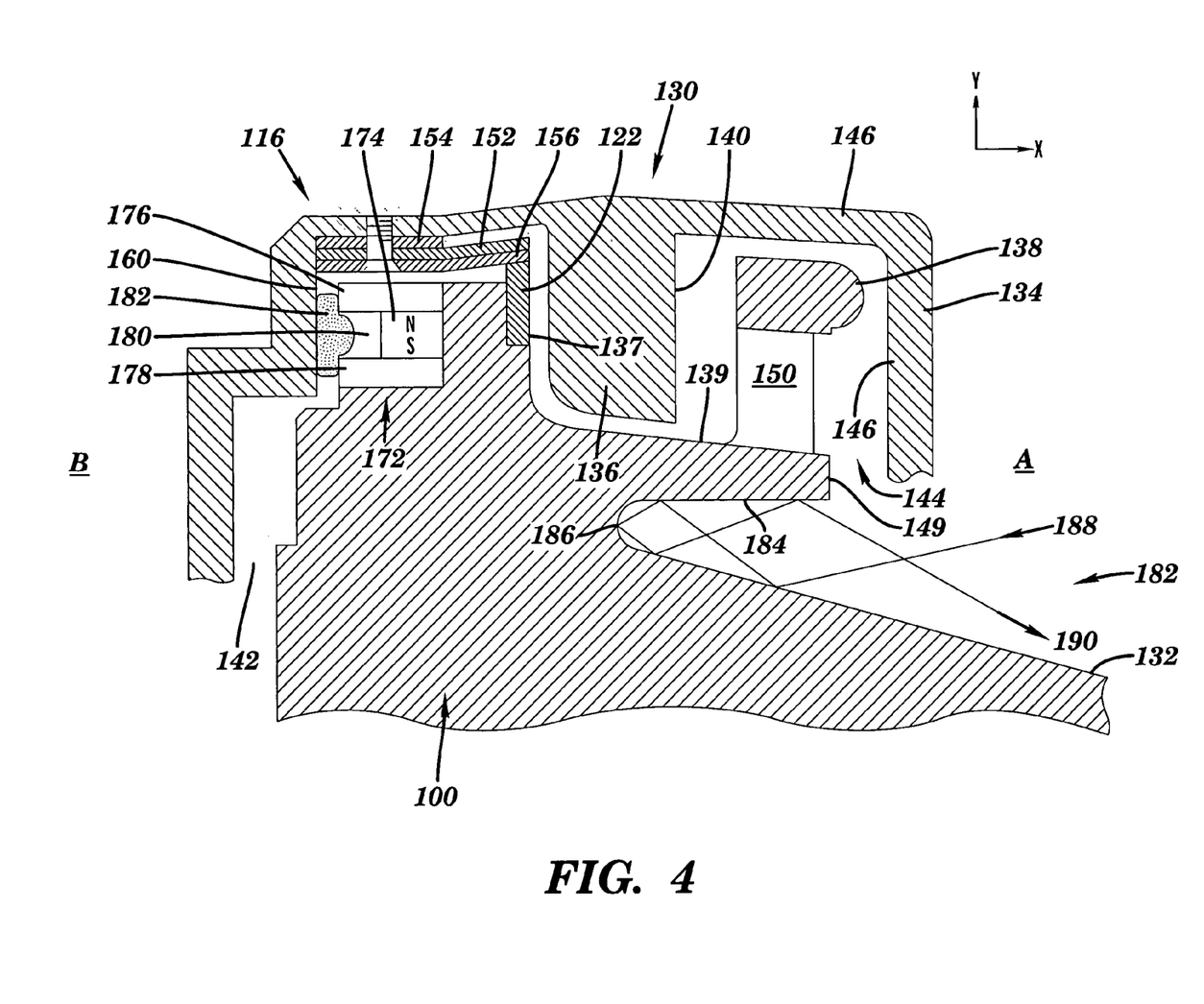
FIG. 4 illustrates a magnified section view of Detail A, taken from FIG. 3, depicting the clearance gap between the fixed azimuth housing and an annular cover section of the cascade hood according to the present invention.

Referring specifically to the rotary joint between the azimuth housing 100, the yoke 102, and the cascade hood 116, FIG. 4 depict a magnified view of Detail A taken from FIG. 3. In particular, FIG. 4 depicts a magnified view of the clearance gap of a rotary joint according to the present invention. As shown, a clearance gap extends continuously from the external environment A to the hollow cavity B, inside the azimuth housing 100. As will be detailed below, a number of design features are used to prevent environmental elements from the external area A from reaching the internal hollow cavity B. In particular, the environment A represents many possible environmental elements such as when the entire turret 30 becomes completely submerged in water, in a marine application, or exposed to rain, snow, sand and other airborne contaminates driven by high winds, or high air speed, as well as fog, mist, smoke, chemical vapors, and the like, and any of these elements may infiltrate the hollow cavity A and cause damage to elements therein unless appropriate protection is provided. According to the present invention, a plurality of elements and design features are used to seal the clearance gap and otherwise prevent contaminates for entering the clearance gap and infiltrating into the inertial cavity B. While the elements and design features may be used in a variety or turret mounting applications, the particular embodiment of the present invention described herein relates to sealing a turret operating in a substantially upwardly facing orientation, i.e. with the ball housing 20 being capable of directing the pointing direction parallel with the Y-axis shown in FIGS. 3 and 4. However, each of the elements and design features, whether used in whole or in part, is also usable for other orientations of the turret 30.

Referring to FIGS. 2–4, the flange portion 104 provides an annular mounting surface 126 on its underside. The annular mounting surface 126 mates with a vehicle or fixed element mounting feature 127 and the flange 104 includes a plurality of mounting holes 129, formed therein, for attaching the azimuth housing 100 to the mounting feature 127. An opening provided in the mounting feature 127 receives the lower part of the azimuth housing 100 therein, i.e. the portions of the azimuth housing positioned below the annular mounting surface 126. A sealing element or a layer of sealing compound, not shown, may be applied between the annular mounting surface 126 and the mounting feature 127 to seal the turret/vehicle mounting interface from contamination.

Referring to detail A, shown in FIG. 4, a magnified sectional view taken through one side of the rotary joint shows the interface between a radially outer edge of the cascade hood 116 and a radially outer edge of the azimuth base 100. As shown therein, each of the azimuth housing 100 and the cascade hood 116 includes a plurality of surfaces positioned on opposing sides of a clearance gap that extends from the external environment A to the internal cavity B. The clearance gap includes an annular inside opening 142, inside the cavity B, and an annular outside opening 144, open to the external environment, and extends continuously from the inside opening 142 to the outside opening 144.

Referring now to features of the cascade hood 116, the hood includes an annular cover portion 130 that overhangs and interfaces with upward facing surfaces of the azimuth housing 100. The annular cover portion 130 extends radially outward from the yoke shaft 112 and includes a continuous upward facing surface 146 for shielding the rotary joint from downwardly directed environmental elements such as falling rain or airborne contaminates. Downwardly directed environment elements falling on the upward facing surface 146 or may drain off or remain thereon.

The annular cover portion 130 also includes a plurality of features formed opposed to the upwardly facing surface 146 and each of the plurality of features have a plurality of surfaces that define the shape and dimension of the clearance gap of the rotary joint. At a radially distal end of the annular cover portion 130, a first annular lip 134 extends substantially vertically downward to block horizontally directed environmental elements, such as wave or wind blown water or other contaminants, from entering the clearance gap. The first lip 134 extends down to oppose a circumferential surface 149 formed on the azimuth housing 100 and the separation between the first lip 134 and the circumferential surface 149 forms the annular open end 144 of the clearance gap. Of course the first lip 134 may be oriented other than vertically downward so long as the first lip 134 protects the annular open end 144 of the clearance gap from the entry of vertically and horizontally directed contaminates.

The extended cover portion 130 also includes a downwardly extending second annular lip 136 positioned radially inward of the first annular lip 134. The second annular lip 136 includes a plurality of surfaces formed opposed to surfaces of the azimuth housing 100 for defining the shape and dimension of the clearance gap of the rotary joint. In particular, the second annular lip 136 provides surfaces opposed to a substantially vertical surface 137 and a sloping drain surface 139, each formed on the azimuth housing 100. Thus the clearance gap between the surface 137 and the second annular lip 136 comprises a substantially vertical leg of the clearance gap formed between substantially vertical surfaces of the azimuth housing 100 and the second annular lip 136. In addition, the dimension of the clearance gap in the vertical leg is sized to resist the flow of liquid and solid contaminates into the vertical leg. As an example, the gap dimension in the vertical leg may be less than 0.75 mm. Alternately, the substantially vertical surface 137 and the opposed surface of the second annular lip 136 may be oriented at other angles for providing a clearance gap at another orientation that still presents resistance to fluid and solid contaminate infiltration. In particular, any leg of the clearance gap oriented to generally oppose within a gravitation force, (e.g. oriented less than 45 degrees from the Y-axis), may present sufficient resistance to fluid and solid contaminate infiltration within that leg of the gap.

As further shown in FIG. 4, an upwardly extending third annular lip 138 is positioned radially between the first annular lip 134 and the second annular lip 136 and extends upwardly from the azimuth housing 100. The third annular lip 138 includes a plurality of surfaces formed opposed to surfaces of the annular cover portion 130 for defining the shape and dimension of other legs of the clearance gap within the rotary joint. In particular, the third annular lip 138 provides substantially verticals surface opposed to the substantially vertical surfaces 140 and 146 of the annular cover portion 130 thereby forming two additional substantially vertical legs of the clearance gap.

Thus according to one aspect of the present invention, the underside of the extended overhanging cover portion 130 includes two downwardly extending lips 134 and 136 that interface with the substantially vertical surface 137, the sloping drain surface 139, and substantially vertical surfaces of the third annular lip 138. The clearance gap formed in the rotary joint by opposing surfaces of each of the annular cover 130 and the azimuth housing 100 therefore forms a labyrinth seal having three substantially vertical legs directed opposed to gravitational force for preventing fluid and solid contaminates from flowing into the vertical legs. In addition, any contaminates that may be forced into the vertical legs, e.g. by wind or wave action, are provided with a drainage path by a common connection with the drain surface 139. As a further means for preventing liquid or solid contaminates from entering the clearance gap, the dimension of the gap is made as small as can be easily achieved by cost effective manufacturing methods. In particular, the dimension of the clearance gap at the entry point 144 is about 1 mm and the dimension of the gap may range to as little as about 0.15 mm in some legs.

While fluids and contaminates may enter the clearance gap at the annular open outer end 144, the convoluted path plus the narrow dimension of the clearance gap in some of its legs make it difficult for contaminating elements to infiltrate the inner cavity B. In addition, the substantially vertically oriented legs of the clearance gap provide a gravitational force resistance to material flowing into and remaining within these legs. As further shown in FIG. 4, the vertical legs may drain onto a first drain surface 139, of the azimuth housing 100, that is formed downwardly sloping toward the exit opening 144. In addition, the third lip 138 is not continuously solid around its circumference but includes a plurality of evenly spaced apart drain openings 150 that pass through the lip 138. As shown, a bottom surface of each drain opening 150 is an uninterrupted continuation of the first drain surface 139. Thus the first drain surface 139 may drain contaminates from any one of the three vertically oriented legs of the clearance gap.

In addition to the labyrinth seal described above, the clearance gap is blocked by a wiper seal formed by the annular pre-seal assembly 118 and the annular seal ring 122. The pre-seal assembly 118 comprises three annular elements and these include an annular flexible seal element 152, an annular seal support element 154 and an annular seal wiper element 156. Each of the three seal elements comprises a flat annular ring having a plurality of mounting holes formed therein such that when the mounting holes of all three elements are aligned, the three elements may be attached to the underside of the extended cover portion 130 by threaded fasteners installed through co-aligned mounting holes. The pre-seal assembly 118 is installed with the seal support element 154 in direct contact with the underside of the annular cover portion 130. The flexible seal element 152 installs in direct contact with the seal support 154 and the seal wiper element 156 installs in direct contact with the underside of the flexible seal element 152.

As shown in FIG. 4, the flexible seal element 152 and the seal wiper 156 have a width that is wider than the width of the seal support 154. Accordingly, an unclamped end of the flexible seal element 152 and the seal wiper element 156 are supported cantilevered into the clearance gap between opposing surfaces of the annular cover portion 130 and the azimuth housing 100. The seal ring 122 is fastened to the azimuth housing 100 in a location that causes a top surface of the seal ring 122 to make contact with the cantilevered unclamped end of the seal wiper element 156. The dimension between the cantilevered end of the seal wiper element 156 and the top of the seal ring 122 is determined by the thickness of the three pre-seal elements and the position of the top of the seal ring 122 and these elements are sized to provide an interference fit between the cantilevered portion of the seal wiper 156 and the top of the seal ring 122 such that when the rotary joint is assembled, the cantilevered pre-seal elements are bent upward by the seal ring 122. As will be further detailed below, the flexible seal element 152 forms a flat spring that resists the bending and thereby generates a force opposed to the bending for keeping the seal wiper 156 in tight contact with the seal ring 122. Accordingly, the pre-seal assembly 118 and the seal ring 122 combine to close the clearance gap. The closed clearance gap prevents most fluid and solid environmental contaminates from penetrating the clearance gap beyond the pre-seal 118.

Figure 5A:
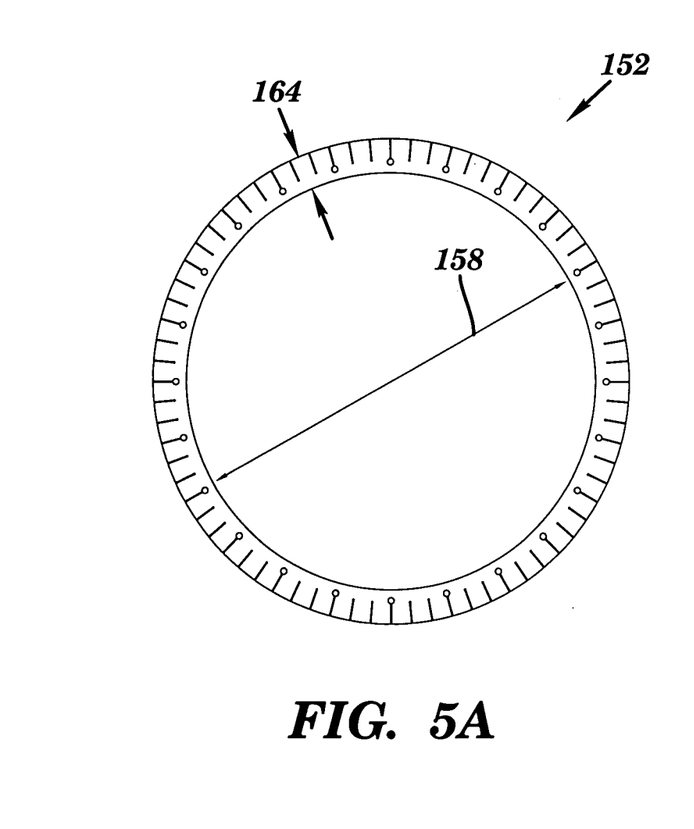
FIG. 5 depicts a detailed view of a wiper seal flexible element according to the present invention.
Figure 5B:
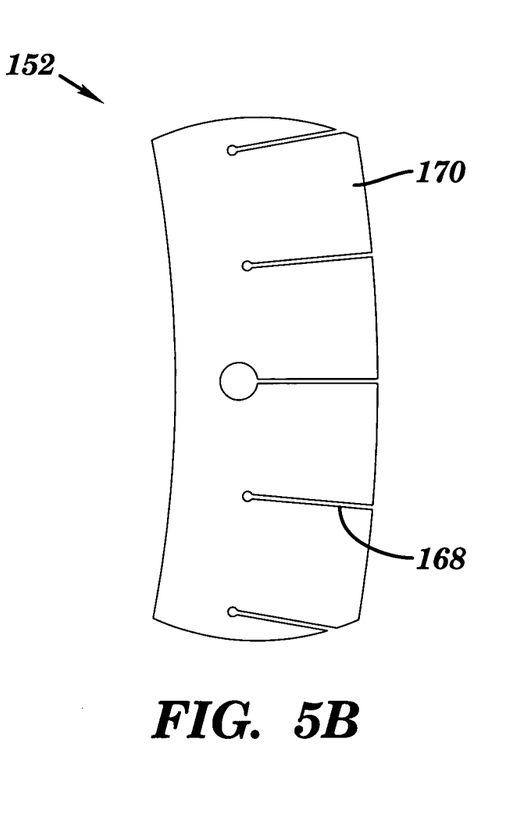
Figure 6:
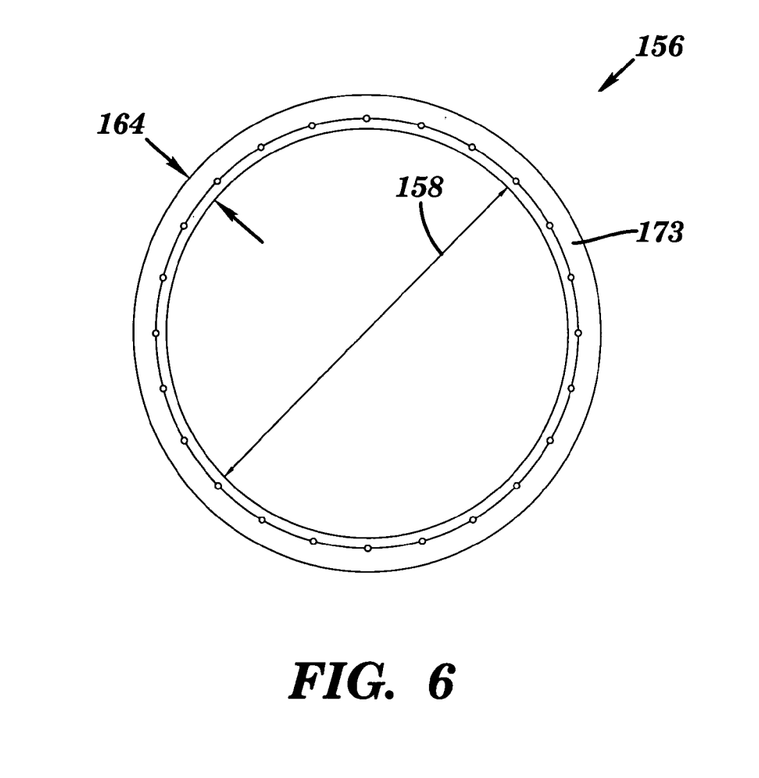
FIG. 6 depicts a detailed view of a low friction wiper seal element according to the present invention.

Details of the pre-seal elements 152, 154 are shown in FIGS. 5 and 6 and of the pre-seal element 156, in FIG. 6. As shown, each of the pre-seal elements comprises a flat annular element having a substantially common inside diameter 158 sized to fit over a shoulder 160 of the cascade hood 116. The seal support 154 has a narrow width 162, as compared to the width of the other pre-seal elements 152 and 154, to provide clearance for the bending of the flexible element 152 and the seal wiper 156. The seal support 154 and the flexible element 152 are each fabricated from a composite material comprising laminated layers of woven fiber glass and epoxy resin filler, such as G10, or the like and each element 152 and 154 has a thickness of approximately 0.75 mm. The G10 material is chosen for its resistance to breakdown by environment elements as well as for its high resistance electrical and thermal energy transfer. In addition, the use of G10 allows each of the elements 152 and 154 to be chemically etched and formed with fine details.

As shown in FIGS. 5 and 6, the flexible element 152 and the wiper element 154 each have a width 164 that is wider than the seal support width 162. As shown in a magnified view of detail A, of FIG. 5, a plurality of radially oriented through slots 168 are formed at five degree intervals around the circumference of the flexible element 152. The slots 168 have a width of about 0.17 mm and extend from the outer circumference radially inward extending through about 60% of the width 164. By cutting of the slots 168, the regions between adjacent slots 168 form flexible fingers 170 that are more easily bent by the bending force provided by contact with the seal ring 122. In addition, by providing a plurality of flexible fingers 170, with each finger being able to bend independently, the shape of the flexible element 152 readily conforms to the contact surface of the seal sing 122 which may have surface irregularities or may be misaligned with the rotation axis.

Figure 7:
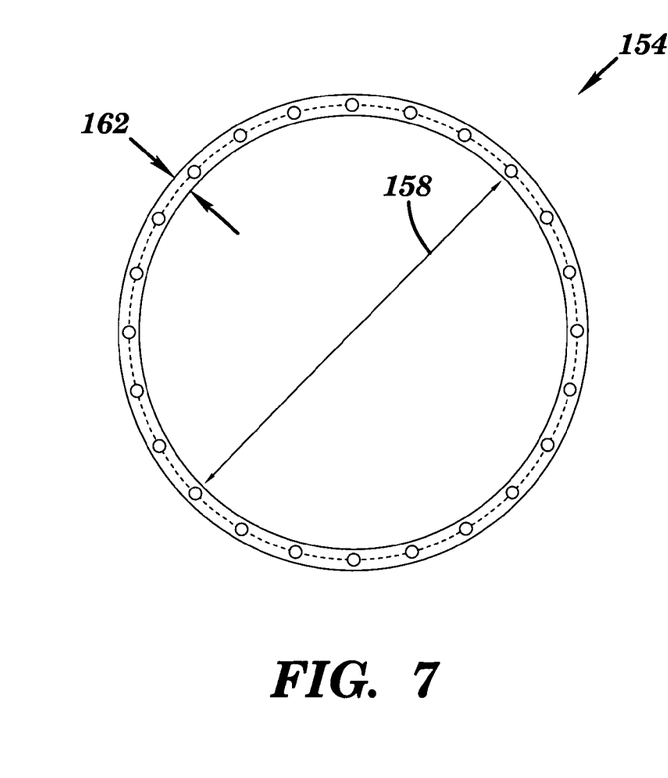
FIG. 7 depicts a detailed view of a wiper support element according to the present invention.

As shown in FIG. 6, the seal wiper element 156 comprises a continuous unbroken annular outer area 172. The seal wiper 156 is fabricated from a thin layer of a dry low friction, wear resistant material wit load carrying capacity, such a polymetric reinforced layer of polytetrafluroroethylene, (PTFE). One such material is available under the trade name RULON J from DIXON DIVISION OF FURON of Bristol R.I., USA. Applicants have found that a layer of RULON J material having a thickness of about 0.25 mm is preferred. The seal wiper 154 is installed between the flexible element 152 and the seal ring 122 to reduce wear and friction at the contact surface of the seal ring 122. In addition, the top or contact surface of the seal ring 122 may include a radius formed at its radially inner edge and the radius may be polished to a fine micro inch finish such as 6–8 micro inches peak to valley. In addition the seal ring 122 is formed from a wear resistant metal such as 316 stainless steel. As further shown in FIGS. 5–7 each of the elements 152, 154 and 156 has a matching hole pattern formed therein so that the elements may be co-aligned with mounting screws for attaching to the underside of the annular cover 130.

Thus according to a further aspect of the present invention, the clearance gap between the azimuth housing 100 and the cascade cover 116 is sealed by a wiper seal comprising a wiper assembly 118 attached to the underside of the cascade cover 116 and forced into mating contact with a seal surface attached to the fixed azimuth housing 100. Specifically, the wiper seal assembly includes a cantilevered contact element having a low friction, wear resistant surface positioned to interfere with the seal surface such that the cantilevered contact element is bent by contact with the seal surface thereby providing a contact force. In addition, the contact element may include a plurality of individual flexible finger elements 170 formed thereon for causing the contact element to conform to irregularities of, or misalignments with, the seal surface. In addition, the seal surface may be formed by a protruding surface integral with the azimuth housing 100 or may be formed by a separate element attached to the azimuth housing. Moreover, the materials for forming the elements of the seal assembly 118 are suitable for long term exposure to environmental elements without degradation in performance. In addition, the wiper seal assembly 118 may mount to the fixed azimuth 100 and the seal ring 122 may mount to the cascade hood 116 without deviating from the present invention.

While the wiper pre-seal seal assembly 118 seals the clearance gap from many environmental elements, the wiper pre-seal 118 is not a gas tight seal. In particular, when the gas pressure inside the cavity B exceeds the pressure of the external environment A, the force generated by internal pressure may force one or more of the flexible fingers 170 to lift away from the seal surface and allow contaminates to pass the wiper pre-seal assembly. In addition the slots 168, used to form the flexible fingers 170, may allow gases and some liquids to seep past the wiper pre-seal assembly 118. Accordingly, a conventional gas-tight magnetic fluid seal 172 is installed within the clearance gap between the wiper pre-seal 118 and the internal cavity B.

Referring to FIG. 4, a fluid seal 172 is attached to a surface of the azimuth base 100. The fluid seal 172 is a conventional magnetic fluid seal such as the type made commercially available by FERRO TECH Inc. of Manchester N.H. The fluid 172, shown schematically in FIG. 4, is similar in operation to a fluid seal described in U.S. Pat. No. 4,357,024 to Raj, which is incorporated herein by reference. The fluid seal 154 comprises and annular ring magnet 174 having opposing north (N) and south (S) magnetic poles. Annular extension rings 176 and 178 are fixedly attached to the north and south poles and form a hollow cavity 180 bordered by the extension rings 176 and 178 and the magnet 174. Each annular extension ring 176 and 178 is formed from a material having a high magnetic permeability for readily conducting magnetic flux therethrough. A magnetic circuit provides a flux path extending from the magnet north pole through the first annular extension ring 176, across the clearance gap to the cascade hood surface 160, through the material of the cascade hood 116, across the clearance gap to the second annular extension ring 178, through the extension ring 178 to the magnet south pole and across the magnet 174. A magnetic fluid 182 is contained within the hollow cavity 180 and is forced to fill the clearance gap between the cascade hood surface 160 and the hollow cavity 180 by the magnetic flux generated in the magnetic circuit described above. The magnetic fluid is held in the clearance gap by the magnetic flux and thereby forms a gas tight seal in the clearance gap local to the surface 160. In this region, the clearance gap has a dimension of approximately 0.15 mm between the surface 160 and the ends of the annular extension rings 176 and 178. In addition, the cascade hood 116 is formed from a magnetically permeable material to ensure that magnetic flux can readily flow through the cascade hood material in the vicinity of the gas tight seal 172. Any magnetically permeable material is usable for forming the cascade hood 116, however; a series stainless steel, or other magnetically permeable stainless steel, is preferred. While the gas tight seal 172 may seal the clearance gap from all contaminates, the particular embodiment described above provides the pre-seal 118 to keep potentially damaging contaminates away from the magnetic fluid 182. In particular, sea water, salt and other environmental elements may degrade the performance of the magnetic fluid 180 and the present invention prevents the magnetic fluid from becoming contaminated.

As a further aspect of the present invention, the azimuth housing 100 is formed with a fluid repelling feature 182, shown in FIG. 4. The fluid repelling feature 182 comprises a continuous annular recess formed by opposing walls 132 and 184. The walls 132 and 184 may be substantially parallel or may be non-parallel but angled to narrow the dimension of the fluid repelling feature 182 at an radially inner end thereof. The annular recess is closed at its inner most end by a radius 186 that may be an elliptical radius. As depicted in FIG. 4, an entering fluid stream 188 is deflected by the walls 132 and 184 and directed toward the radius 186. Upon reaching the radius 186 the direction of the entering stream 188 is reversed and the stream becomes an exiting fluid stream 190. The energy of the exiting fluid stream 190 may interact with the incoming stream 188 and deflect it away from the clearance gap entrance 144. In addition, incoming fluid from other directions may be defused by the energy of the exiting fluid stream 190 as well. In general, the annular fluid repelling feature 182 works equally well to deflect and diffuse incoming streams of a gas or a liquid. In cases where the direction of incoming fluid is constant, such as when the vehicle is in motion or a steady wind is blowing, the exiting fluid stream 190 may form a continuous pressurized zone directed at incoming contaminates for preventing incoming fluid from entering the clearance gap at entrance 144.

Thus according to the invention described above a rotary joint includes a clearance gap extending from an external environment A to and internal cavity B. The clearance gap is sealed by a labyrinth seal comprising a convoluted pathway comprising a plurality of legs with at least one leg being oriented to generally oppose gravitational forces for increasing the resistance to materials infiltrating the leg. In addition, the clearance gap is blocked by a wiper seal 118 having a flexible element 152 being bent by continuous contact with a seal ring surface 122 and wherein the wiper seal further includes a low friction wear resistant surface 156 in contact with the seal ring surface for reducing friction between the seal ring surface and the wiper seal. In addition, the clearance gap is blocked by a gas tight magnetic fluid seal positioned between the internal cavity B and the wiper seal 118. According to a second embodiment of the invention, the labyrinth seal and the wiper seal assembly 188 alone may be used to block the clearance gap of the rotary joint when a gas tight seal is not required by the application. According to a third embodiment of the present invention the labyrinth seal and the gas tight magnetic fluid seal 172 may be used alone to block the clearance gap of the rotary joint. According to a fourth embodiment of the present invention, the gas tight seal 172 and the wiper seal 118 alone may be used to block the clearance gap of the rotary joint. In addition, each of the embodiments described herein may also be used to seal each of the recessed cavities 110 for protecting elements of the elevation drive.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. for sealing the azimuth rotary joint of an upwardly facing turret mounted camera system, those skilled in the art will recognize that its usefulness is not limited thereto and that the present invention can be beneficially utilized in any number of environments and implementations including but not limited to any turret mounted device oriented to face any direction. Accordingly, the claims set forth below should be construed in view of the full breadth and spirit of the invention as disclosed herein.

We claim:

1. A rotatable payload support turret for operation in a potentially hazardous environment, the support turret comprising a fixed element and a rotatable element, supported by the fixed element, for rotation with respect thereto, comprising:

an annular rotary seal attached to the fixed element in an annular clearance gap formed between said fixed element and said rotatable element, said annular rotary seal comprising a magnetic circuit formed to capture a magnetic fluid in the annular clearance gap thereby sealing the clearance gap with a gas tight seal; and, an annular wiper seal assembly positioned in said annular clearance gap between said potentially hazardous environment and said annular rotary seal for sealing the clearance gap to prevent elements of said potentially hazardous environment from contaminating said magnetic fluid, the annular wiper seal comprising; an annular flexible member attached to the rotatable element for rotation therewith, and an annular sealing surface attached to said fixed element, said annular flexible member being forced into contact with said annular sealing surface during rotation of said rotatable element.

2. The rotatable payload support turret of claim 1 wherein each of said fixed element and said rotatable element are configured with opposing surfaces for forming said clearance gap there between, and further wherein said opposing surfaces are configured to form a labyrinth seal comprising at least one leg of the clearance gap formed to resist infiltration of said potentially harmful elements.

3. The rotatable payload support turret of claim 2 wherein said opposing surfaces are configured to form the labyrinth seal with three legs of the clearance gap formed to resist infiltration of said potentially harmful elements.

4. The rotatable payload support turret of claim 1 wherein the clearance gap includes an annular outer opening formed between opposing surfaces of the fixed element and the rotatable element and further wherein said fixed element is configured with a surface sloping downwardly toward said annular opening for draining potentially hazardous elements from the clearance gap.

5. The rotatable payload support turret of claim 1 wherein the clearance gap includes an annular outer opening formed between opposing surfaces of the fixed element and the rotatable element and further wherein said fixed element is configured with an annular fluid repelling feature positioned adjacent to said annular opening for repelling an incoming fluid stream away from the annular outer opening.

6. The rotatable payload support turret of claim 5 wherein the fluid repelling feature comprises an annular recess formed by opposing surfaces of the fixed element, the annular recess having an radially outward facing open end and a radially inward facing closed end, said inward facing closed end being formed by a radius between the opposing surfaces, and wherein the outward facing open end is positioned adjacent to said clearance gap annular outer opening.

7. The rotatable payload support turret of claim 1 wherein said fixed element comprises an azimuth housing having an internal cavity formed therein and wherein said rotatable element comprises a yoke for supporting the payload for rotation about an elevation axis, said yoke including a shaft extending from a bottom end thereof for mating with rotary bearings installed in the azimuth housing further comprising:

a cascade hood attached to the yoke and rotatable therewith, the cascade hood including an annular cover portion extending radially outward from the shaft and overhanging upward facing surfaces of the azimuth housing for protecting an annular clearance gap formed between the azimuth housing and the cascade hood from downwardly directed elements of the potentially hazardous environment.

8. The rotatable payload support turret of claim 7 wherein the cascade hood further comprises a first annular lip extending substantially vertically downward from a radially distal end of the annular cover portion to oppose a circumferential surface of the azimuth housing thereby forming an annular opening of the annular clearance gap.

9. The rotatable payload support turret of claim 8 wherein the cascade hood further comprises a second annular lip positioned radially inward from the first annular lip, said second annular lip having surfaces opposed to a substantially vertical surface of the azimuth housing for forming a leg of the clearance gap that is formed to resist infiltration of said potentially harmful elements.

10. The rotatable payload support turret of claim 9 wherein the azimuth housing includes a substantially upwardly extending third annular lip positioned radially between the first annular lip and the second annular lip, said third annular lip including a plurality of surfaces formed opposed to surfaces of an underside of the annular cover portion and to surfaces of said first annular lip and said second annular lip for defining the shape and dimension of the clearance gap and particularly for forming two additional legs of the clearance gap that are formed to resist infiltration of said potentially harmful elements.

11. The rotatable payload support turret of claim 9 wherein the third annular lip is formed with a plurality of drain openings passing therethrough for draining portions of the clearance gap that are radially inward of said third annular lip.

* * * * *